US009405139B2

(12) United States Patent
Sugimoto

(10) Patent No.: US 9,405,139 B2
(45) Date of Patent: Aug. 2, 2016

(54) LIQUID CRYSTAL DISPLAY DEVICE HAVING A FRAME SURROUNDING AND HOLDING A LIQUID CRYSTAL DISPLAY ELEMENT AND A BACKLIGHT

(71) Applicant: Japan Display Inc., Minato-ku (JP)

(72) Inventor: Toshikatsu Sugimoto, Minato-ku (JP)

(73) Assignee: Japan Display Inc., Minato-ku (JP)

( * ) Notice: Subject to any disclaimer, the term of this patent is extended or adjusted under 35 U.S.C. 154(b) by 183 days.

(21) Appl. No.: 14/024,805

(22) Filed: Sep. 12, 2013

(65) Prior Publication Data

US 2014/0085565 A1    Mar. 27, 2014

(30) Foreign Application Priority Data

Sep. 24, 2012  (JP) .................................. 2012-209899

(51) Int. Cl.
    G02F 1/1335    (2006.01)
    G02F 1/1333    (2006.01)
    F21V 8/00      (2006.01)

(52) U.S. Cl.
    CPC ........ G02F 1/133308 (2013.01); G02B 6/0088 (2013.01); G02F 1/133606 (2013.01); *G02F 1/133608* (2013.01); *G02F 2201/54* (2013.01)

(58) Field of Classification Search
    CPC ............ G02B 6/0088; G02F 1/133606; G02F 1/133608; G02F 2201/54
    See application file for complete search history.

(56) References Cited

U.S. PATENT DOCUMENTS

| 7,212,722 | B2 * | 5/2007 | Shinohara ...................... 385/146 |
| 7,339,635 | B2 * | 3/2008 | Freking et al. .................. 349/58 |
| 7,643,106 | B2 * | 1/2010 | Meijers ................ G02B 6/0056 349/62 |
| 7,719,628 | B2 * | 5/2010 | Suh ....................... G02B 6/0088 349/122 |
| 2007/0121341 | A1 * | 5/2007 | Owada .......................... 362/606 |
| 2009/0231507 | A1 * | 9/2009 | Oohira .............. G02F 1/133608 349/58 |
| 2011/0199556 | A1 * | 8/2011 | Oohira .............. G02F 1/133308 349/62 |

FOREIGN PATENT DOCUMENTS

JP    2008-9374    1/2008

OTHER PUBLICATIONS

U.S. Appl. No. 14/107,630, filed Dec. 16, 2013, Sugimoto, et al.

* cited by examiner

*Primary Examiner* — Paisley L Arendt

(74) *Attorney, Agent, or Firm* — Oblon, McClelland, Maier & Neustadt, L.L.P.

(57) ABSTRACT

According to one embodiment, a backlight includes a light source, a light guide plate provided laterally to the light source to convert light from the light source into planar light, and multiple optical sheets provided in a laminated manner between the light guide plate and a liquid crystal panel. A liquid crystal display device includes a frame surrounding and holding the liquid crystal panel and the backlight. The frame includes fitted portions recessed in positions opposed to the optical sheets. The optical sheets each include protrusions provided on both sides close to the light source to be fitted into the respective fitted portions. The optical sheets each further include a stuck portion provided on the side near the light source and stuck to a double-sided adhesive tape.

3 Claims, 2 Drawing Sheets

LIQUID CRYSTAL DISPLAY DEVICE HAVING A FRAME SURROUNDING AND HOLDING A LIQUID CRYSTAL DISPLAY ELEMENT AND A BACKLIGHT

INCORPORATION BY REFERENCE

The present invention claims priority under 35 U.S.C. §119 to Japanese Patent Application No. 2012-209899 filed on Sep. 24, 2012. The content of the application is incorporated herein by reference in their entirety.

FIELD

An embodiment described herein relates generally to a liquid crystal display device having a backlight with an optical sheet provided between a light guide body and a liquid crystal display element.

BACKGROUND

Liquid crystal display devices are used across a wide range of industries and, taking advantage of their thinness, low power consumption, etc., are increasingly applied to mobile terminals (portable devices) such as cell-phones and tablet PCs.

Backlights used in liquid crystal display devices consist of a light source, a light guide plate, and an optical sheet, which are generally held integrally by resin molded frame. Convex protrusions are then provided at several points on the periphery of the optical sheet in a manner fittable into concave fitted portions provided in the frame to prevent the optical sheet from being displaced when an external force is applied thereto.

DETAILED DESCRIPTION

The liquid crystal display device according to the embodiment includes a liquid crystal display element. The liquid crystal display device also includes a backlight for irradiating planar light onto the liquid crystal display element. The backlight includes a light source, a light guide body provided laterally to the light source to convert light from the light source into planar light, and multiple optical sheets provided in a laminated manner between the light guide body and the liquid crystal display element. The liquid crystal display device also includes a double-sided adhesive tape bonding the backlight and the liquid crystal display element. The liquid crystal display device further includes a frame surrounding and holding the liquid crystal display element and the backlight. The frame includes fitted portions recessed in positions opposed to the optical sheets. The optical sheets each include protrusions provided on both sides close to the light source to be fitted into the respective fitted portions. The optical sheets each further include a stuck portion provided on the side near the light source and stuck to the double-sided adhesive tape.

The arrangement according to the embodiment will hereinafter be described with reference to FIGS. 1 to 3.

Figure 1:
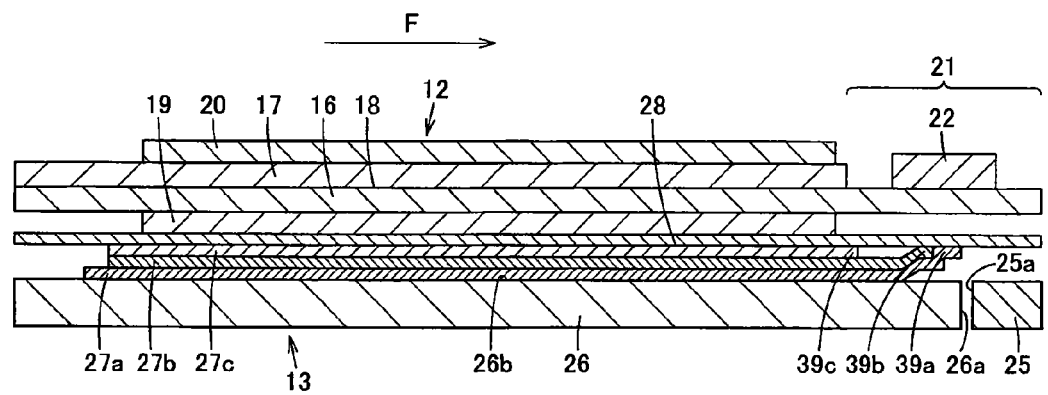
FIG. 1 is a cross-sectional view of a liquid crystal display device according to an embodiment.
Figure 2:
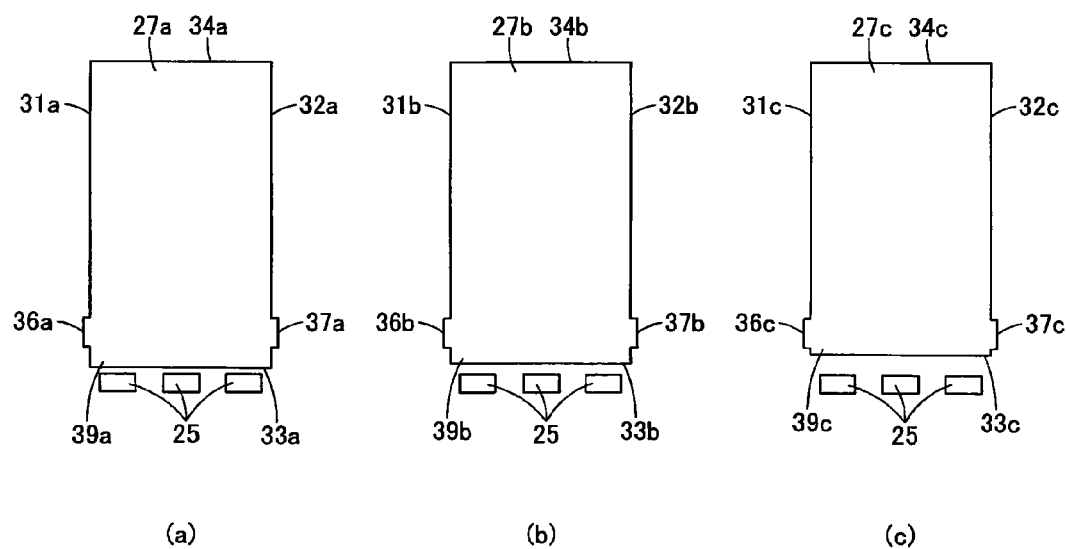
FIGS. 2(a) to 2(c) are plan views of optical sheets included in the liquid crystal display device.
Figure 3:
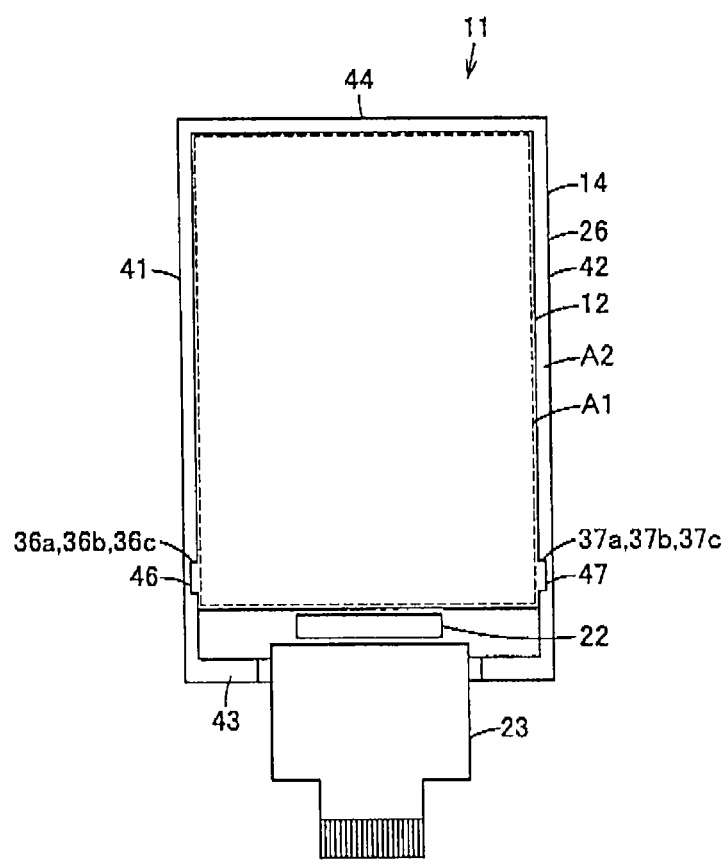
FIG. 3 is a plan view of the liquid crystal display device.

In FIGS. 1 to 3, the reference numeral 11 denotes a liquid crystal display device, which may be used in portable devices such as cell-phones. The liquid crystal display device 11 is a so-called transmissive liquid crystal display module including a planar liquid crystal panel 12 serving as a transmissive liquid crystal display element, a backlight 13 serving as a planar light source for irradiating planar light onto the liquid crystal panel 12, and a frame 14 holding the liquid crystal panel 12 and the backlight 13.

The liquid crystal panel 12 is formed in a quadrilateral shape in plan view, including an array substrate 16 and an opposite substrate 17 disposed in a mutually opposed manner and bonded with an adhesive layer not shown, a liquid crystal layer 18 provided and sealed between the substrates 16 and 17, and polarizing plates 19 and 20 attached to the respective substrates 16 and 17. A protective plate such as a translucent cover not shown is attached on the display side, one principal surface of the liquid crystal panel 12, in a manner covering the polarizing plate 20. The liquid crystal panel 12 includes a display area A1 formed in, for example, a quadrilateral shape corresponding to the liquid crystal layer 18 and a frame area A2, a non-display area, formed in, for example, a quadrilateral frame shape to surround the display area A1. The liquid crystal panel 12 is an active matrix type one in which multiple pixels (sub-pixels) formed in a matrix in the display area A1 are switched by a switching device such as a thin film transistor so that the amount of transmission (blocking) of light from the backlight 13 is controlled, whereby images can be color-displayed thereon. In this embodiment, the liquid crystal panel 12 (liquid crystal display device 11) has a display area A1 of 4.3-inch size, for example.

The array substrate 16 is composed of a glass substrate serving as a quadrilateral flat and light-transmissible insulating substrate and, on the principal surface thereof near the liquid crystal layer 18, scan lines and signal lines are disposed in a grid-like manner with thin film transistors (TFTs) serving as switching devices provided at the intersections of the scanning lines and signal lines, which are covered with an alignment film, not shown, formed for alignment of liquid crystal molecules in the liquid crystal layer 18. The amount of transmission (blocking) of light from the backlight 13 through each pixel can then be switched by the switching feature of the thin film transistors.

The opposite substrate 17 is composed of a glass substrate serving as a quadrilateral flat and translucent insulating substrate that corresponds to the glass substrate of the array substrate 16, on which a color filter layer such as a coloring layer is formed, which is covered with a counter electrode formed as a transparent common electrode for setting a common potential for each pixel (sub-pixel), which in turn is covered with an alignment film formed for alignment of the liquid crystal layer 18. The opposite substrate 17 also has a lateral (width) dimension approximately equal to that of the array substrate 16 and a longitudinal dimension smaller than that of the array substrate 16. The opposite substrate 17 is then bonded to the array substrate 16 with the long sides and one short side thereof being aligned with those of the array substrate 16. With this arrangement, the opposite substrate 17 has a non-facing area 21 not faced to the array substrate 16 around the other short side. In this non-facing area 21, a driver IC 22 is mounted serving as a control circuit to generate a signal for controlling each pixel (thin film transistor), to which a flexible circuit board 23 for electrically connecting the driver IC 22 and an external circuit is electrically connected using, for example, an anisotropic conductive film (ACF).

In the color filter layer, coloring portions of R (red), G (green), B (blue), etc., made of, for example, synthetic resin are formed in a striped manner corresponding to each pixel (sub-pixel). It is noted that if the liquid crystal panel 12 does not perform color display, for example, a monochrome display, there is no need to provide such a color filter layer. The color filter layer may be provided on the array substrate 16.

The backlight 13 includes multiple (semiconductor) light sources 25 such as LEDs, a light guide plate 26 serving as a quadrilateral flat light guide body for converting light from the light sources 25 into planar light, and (first to third) optical sheets 27a, 27b, and 27c for uniformizing light emitted from the light guide plate 26. The liquid crystal panel 12 (polarizing plate 19) and the backlight 13 (third optical sheet 27c) are then bonded using, for example, a double-sided adhesive tape 28 quadrilateral in plan view.

The light sources 25 are each provided separately from the light guide plate 26 with the light emitting surface 25a thereof being opposed to the light incident surface 26a, one end face on one short side of the light guide plate 26. The light sources 25 are also disposed separately from each other at approximately equal intervals along the light incident surface 26a of the light guide plate 26.

The light guide plate 26 is made of, for example, synthetic resin and formed to have approximately the same size and, in this embodiment, approximately the same shape as the liquid crystal panel 12, and disposed such that the light emitting surface 26b, one principal surface, is opposed to the dorsal side of the liquid crystal panel 12.

The optical sheets 27a, 27b, and 27c are each made of, for example, synthetic resin, formed in a quadrilateral shape, and laminated successively to cover the light emitting surface 26b of the light guide plate 26. That is, the optical sheets 27a, 27b, and 27c are provided between the light guide plate 26 (light emitting surface 26b) and the liquid crystal panel 12. The optical sheets 27a, 27b, and 27c further have, respectively, a pair of opposed long sides 31a and 32a, 31b and 32b, 31c and 32c, and a pair of opposed short sides 33a and 34a, 33b and 34b, 33c and 34c. The long sides 31a, 32a, 31b, 32b, 31c, and 32c are disposed along the respective long sides of the light guide plate 26, while the short sides 33a, 34a, 33b, 34b, 33c, and 34c are disposed along the respective short sides of the light guide plate 26. Protrusions 36a, 37a, 36b, 37b, 36c, and 37c are then provided as quadrilateral convex ear portions in positions on the respective long sides 31a, 32a, 31b, 32b, 31c, and 32c close to the short sides 33a, 33b, and 33c, with respect to the longitudinal center, that is, in the vicinity of the short sides 33a, 33b, and 33c. In addition, the short sides 33a, 33b, and 33c of the optical sheets 27a, 27b, and 27c are opposed to the light sources 25 sides. That is, the short sides 33a, 33b, and 33c of the optical sheets 27a, 27b, and 27c are provided along the light incident surface 26a of the light guide plate 26. The short sides 33a, 33b, and 33c of the optical sheets 27a, 27b, and 27c extend out of the display area A1 of the liquid crystal panel 12 toward the light sources 25. The vicinities of the extending short sides 33a, 33b, and 33c inclusive serve, respectively, as stuck portions 39a, 39b, and 39c stuck with the double-sided adhesive tape 28. It is noted that the first optical sheet 27a is, for example, a diffusion sheet, while the second and third optical sheets 27b and 27c are, for example, prism sheets. The first optical sheet 27a is laminated directly on the light emitting surface 26b of the light guide plate 26, the second optical sheet 27b is laminated directly on the first optical sheet 27a, and the third optical sheet 27c is laminated directly on the second optical sheet 27b and bonded wholly to the double-sided adhesive tape 28. Accordingly, the short side 33a of the first optical sheet 27a extends closer to the light sources 25 than the short side 33b of the second optical sheet 27b and overlaps the short side 33b, and the short side 33b of the second optical sheet 27b extends closer to the light sources 25 than the short side 33c of the third optical sheet 27c and overlaps the short side 33c.

The frame 14 is made of synthetic resin and integrally molded in a bottomed rectangular cylindrical shape (quadrilateral frame shape) to form a frame portion surrounding the liquid crystal panel 12 and the backlight 13. That is, the frame 14 integrally includes a pair of frame long sides 41 and 42 and a pair of frame short sides 43 and 44. Quadrilateral fitted portions 46 and 47 into which the protrusions 36a, 37a, 36b, 37b, 36c, and 37c of the optical sheets 27a, 27b, and 27c are to be fitted are then provided in a recessed manner in positions on the pair of respective frame long sides 41 and 42 of the frame 14 near the frame short side 43, with respect to the longitudinal center, that is, in the vicinity of the frame short side 43. It is noted that a metallic bezel not shown is attached to the frame 14 in a manner covering the liquid crystal panel 12 with at least the display area A1 being exposed.

In the process of assembling the liquid crystal display device 11, the light sources 25 and the light guide plate 26 are first arranged and held with respect to the preliminarily molded frame 14.

Next, the substrates 16 and 17 are bonded to each other with the liquid crystal layer 18 provided therebetween and the driver IC 22 and the flexible circuit board 23 etc., are mounted, and the optical sheets 27a, 27b, and 27c are bonded, using the double-sided adhesive tape 28, to the liquid crystal panel 12 preliminarily formed by attaching the polarizing plates 19 and 20. In this step, the third optical sheet 27c is bonded wholly, including the short side 33c (stuck portion 39c), to the double-sided adhesive tape 28, while the first and second optical sheets 27a and 27b are bonded to the double-sided adhesive tape 28 via the respective stuck portions 39a and 39b including the short sides 33a and 33b.

Further, the liquid crystal panel 12 and the optical sheets 27a, 27b, and 27c are attached and held onto the frame 14 while the protrusions 36a, 37a, 36b, 37b, 36c, and 37c of the optical sheets 27a, 27b, and 27c are aligned with and fitted into the fitted portions 46 and 47 of the frame 14 to complete the liquid crystal display device 11.

Light emitted from the light emitting surface 25a of each light source 25 is made incident into the light incident surface 26a of the light guide plate 26 and then converted into planar light across the light guide plate 26, and thereafter uniformized through the optical sheets 27a, 27b, and 27c to be fed to the dorsal side of the liquid crystal panel 12. At the same time, in the display area A1 of the liquid crystal panel 12, the amount of transmission (blocking) of planar light from the backlight 13 through each pixel driven corresponding to an image signal is set to display an image to the observer.

Even when the liquid crystal display device 11 may be dropped accidentally, for example, and applied with an impact and therefore a locally great stress (force F), the load on the protrusions 36a, 37a, 36b, 37b, 36c, and 37c is reduced by the stuck portions 39a, 39b, and 39c stuck to the double-sided adhesive tape 28, whereby the protrusions 36a, 37a, 36b, 37b, 36c, and 37c are less likely to be deformed and thereby the optical sheets 27a, 27b, and 27c are prevented from being displaced.

In accordance with the above-described embodiment, since the protrusions 36a, 37a, 36b, 37b, 36c, and 37c to be fitted into the fitted portions 46 and 47 of the frame 14 are provided on both sides of the optical sheets 27a, 27b, and 27c close to the light sources 25 and the vicinities of the short sides 33a, 33b, and 33c inclusive near the light sources 25 serve as the stuck portions 39a, 39b, and 39c stuck to the double-sided adhesive tape 28 bonding the backlight 13 and the liquid crystal panel 12, a stress applied when the liquid crystal display device 11 is dropped, for example, can be supported not only by the fitting of the protrusions 36a, 37a, 36b, 37b, 36c, and 37c into the fitted portions 46 and 47 but also by the stuck portions 39a, 39b, and 39c stuck to the double-sided adhesive tape 28, so that the load on the protrusions 36a, 37a, 36b, 37b, 36c, and 37c can be reduced. As a result, the displacement of the optical sheets 27a, 27b, and 27c due to deformation of the protrusions 36a, 37a, 36b, 37b, 36c, and 37c can be prevented effectively while not increasing but reducing the thickness of the sides 41, 42, 43, and 44 of the frame 14 to achieve a narrowed frame structure.

Also, since the optical sheets 27a, 27b, and 27c are each formed in a rectangular shape having the pair of long sides 31a and 32a, 31b and 32b, 31c and 32c and the pair of short sides 33a and 34a, 33b and 34b, 33c and 34c, the protrusions 36a, 37a, 36b, 37b, 36c, and 37c are provided in positions on the respective long sides 31a, 32a, 31b, 32b, 31c and 32c close to the short sides 33a, 33b, and 33c positioned near the light sources 25, and the vicinities of the short sides 33a, 33b, and 33c inclusive serve as the stuck portions 39a, 39b, and 39c stuck to the double-sided adhesive tape 28, the arrangement can be made easily in which the optical sheets 27a, 27b, and 27c are fixed by the protrusions 36a, 37a, 36b, 37b, 36c, and 37c and the stuck portions 39a, 39b, and 39c.

Further, compared to conventional cases where protrusions are provided at several points on each long side of an optical sheet to fix the optical sheet to a frame, it is only required to provide one protrusion 36a, 37a, 36b, 37b, 36c, or 37c on each of the long sides 31a, 32a, 31b, 32b, 31c, and 32c, that is, the number of protrusions can be reduced compared to the conventional cases, and therefore it is only required to provide, on each of the frame long sides 41 and 42 of the frame 14, one fitted portion 46 or 47 into which the protrusions 36a or 37a, 36b or 37b, and 36c or 37c are to be fitted. The frame 14 can thus be strengthened relatively compared to the conventional cases even if having a narrowed frame structure, whereby the frame 14 can be less likely to be deformed upon assembling of the liquid crystal display device 11 as well as to roll back even if the display area A1 has a larger size, which allows the dimensional accuracy to be maintained.

In addition, since the number of protrusions 36a, 37a, 36b, 37b, 36c, and 37c is reduced, it is possible to ensure a sufficient strength of the frame 14 even if the protrusions 36a, 37a, 36b, 37b, 36c, and 37c may be lengthened to prevent displacement of the optical sheets 27a, 27b, and 27c more reliably.

It is therefore possible to provide a liquid crystal display device 11 having a sufficient strength whereby the display quality can be prevented effectively from being deteriorated even when it may be dropped accidentally.

Since it is also required to neither add components nor change materials separately, the optical properties of the liquid crystal display device 11 are not affected.

It is noted that in the above-described embodiment, the number of optical sheets is not limited to three as long as there are two or more.

Further, the liquid crystal panel 12 may be, for example, a semi-transmissive type.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display device comprising:
a liquid crystal display element including one substrate and another substrate opposed to the one substrate, a non-facing area in which the one substrate projects with respect to the other substrate, and a driver integrated circuit IC mounted on a first surface of the one substrate in the non-facing area;
a backlight including a light source, a light guide body provided laterally to the light source to convert light from the light source into planar light, and a plurality of optical sheets provided in a laminated manner between the light guide body and the liquid crystal display element, the backlight arranged to irradiate the planar light onto the liquid crystal display element;
a double-sided adhesive tape bonding the backlight and the liquid crystal display element; and
a frame surrounding and holding the liquid crystal display element and the backlight, wherein
the frame includes fitted portions recessed in positions opposed to the optical sheets, and wherein
the optical sheets are each formed in a rectangular shape having a pair of long sides and a pair of short sides, and one short side of the pair of short sides being positioned near the light source;
the optical sheets each include:
only a single protrusion provided in a predetermined position of each optical sheet on the respective long sides close to the one short side to be fitted into the respective fitted portions;
a stuck portion provided only in a vicinity of the one short side inclusive and stuck to the double-sided adhesive tape;
each singular protrusion on each of the optical sheets has the same shape and size; and
the stuck portion is disposed on a second surface of the one substrate in the non-facing area.

2. The liquid crystal display device according to claim 1, wherein
the optical sheets include a first optical sheet laminated on the light guide body, a second optical sheet laminated on the first optical sheet, and a third optical sheet laminated on the second optical sheet, wherein
the one short side of the second optical sheet is extended closer to the light source than the one short side of the third optical sheet, wherein
the one short side of the first optical sheet is extended closer to the light source than the one short side of the second optical sheet, and wherein
the first optical sheet and the second optical sheet are stuck to the double-sided adhesive tape.

3. The liquid crystal display device according to claim 1, wherein the optical sheets are arranged to uniformize light emitted from the light guide body.

* * * * *